W. SHAW.
RUNNING GEAR.
APPLICATION FILED OCT. 9, 1907.

912,424.

Patented Feb. 16, 1909.
2 SHEETS—SHEET 1.

WITNESSES.

INVENTOR.
William Shaw
By Benedict, Morsell & Caldwell
ATTORNEYS.

W. SHAW.
RUNNING GEAR.
APPLICATION FILED OCT. 9, 1907.
912,424.
Patented Feb. 16, 1909.
2 SHEETS—SHEET 2.
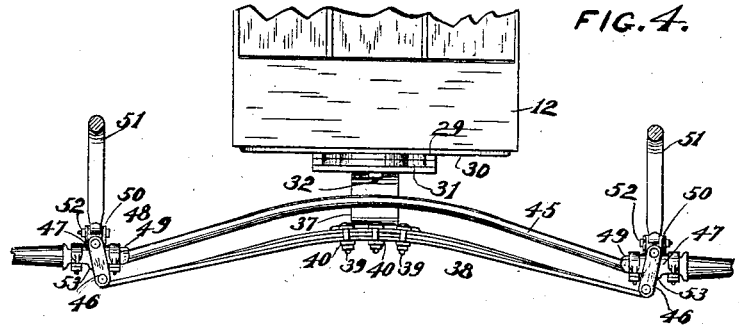
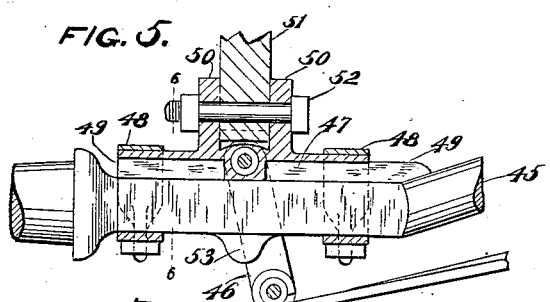
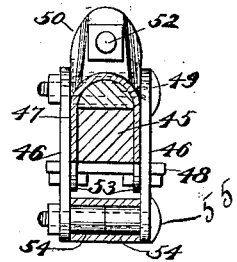
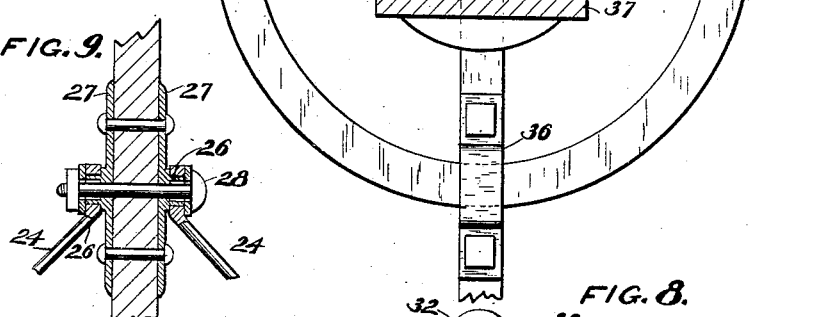
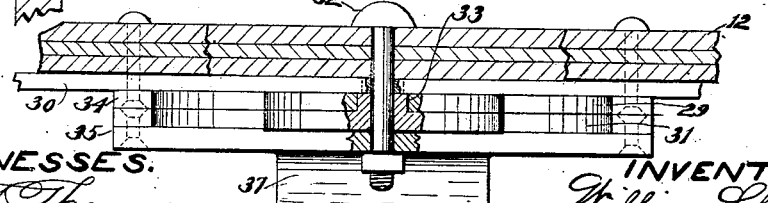
WITNESSES.
INVENTOR.
William Shaw
By Benedict, Morsell & Caldwell
ATTORNEYS.

UNITED STATES PATENT OFFICE.

WILLIAM SHAW, OF WEST ALLIS, WISCONSIN.

RUNNING-GEAR.

No. 912,424.　　　Specification of Letters Patent.　　　Patented Feb. 16, 1909.

Application filed October 9, 1907. Serial No. 396,606.

*To all whom it may concern:*

Be it known that I, WILLIAM SHAW, residing in West Allis, county of Milwaukee, and State of Wisconsin, have invented new and useful Improvements in Running-Gears, of which the following is a description, reference being had to the accompanying drawings, which are a part of this specification.

This invention relates to improvements in running gears for use in connection with a buggy or similar light vehicle, and has for its principal object to provide a running gear which is simple, strong and durable and contains but a minimum number of parts, and in which the entire gear is connected and carried by springs yieldingly connected to the box or body.

Another object of the invention is to provide a gear with the springs thereof located beneath the axle and pivotally connected thereto to admit of an oscillating movement of the wheels and axle without affecting the body of the vehicle attached to said springs.

A further object of the invention is to so connect the box or body of the vehicle to the running gear that it will always yield in a vertical line and will have no tendency to tilt even when loaded on one side.

A still further object of the invention is to provide improved means for connecting all the parts of the running gear together and to the body of the vehicle.

A still further object of the invention is to provide a running gear so connected and positioned that all jolts and shocks will be minimized and the use of pneumatic or rubber tires will be unnecessary.

With the above, and other, objects in view the invention consists of the parts and combination of parts, and all equivalents thereof.

Figure 1:
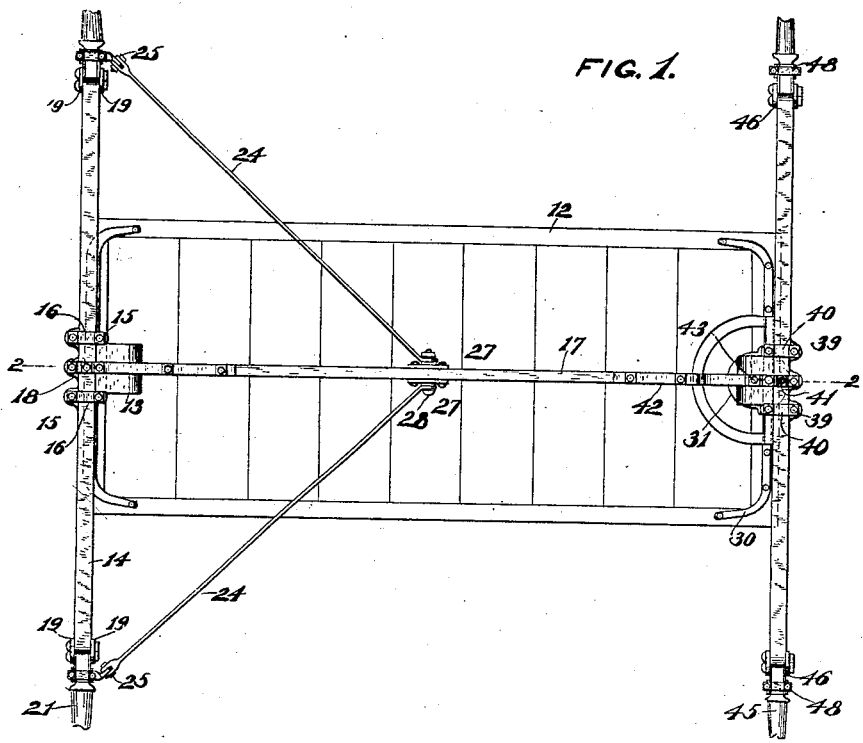
Figure 2:
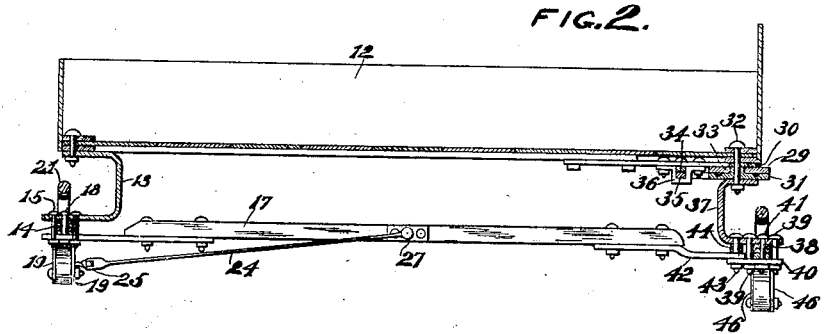
Figure 3:
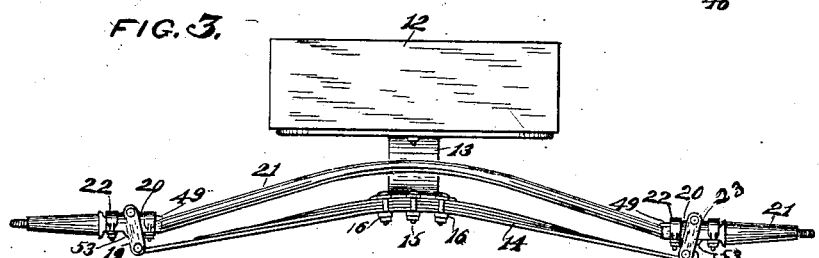

In the accompanying drawings, in which like characters of reference refer to the same parts; Figure 1 is an inverted plan view of my improved running gear attached to a vehicle body or box; Fig. 2 is a cenrtal longitudinal sectional view thereof taken on line 2—2 of Fig. 1; Fig. 3 is a rear view of the rear axle and connecting parts; Fig. 4 is a front view of the front axle and connecting parts; Fig. 5 is a view of a fragment of the front axle with the spring connection and thill coupling in section; Fig. 6 is a section of the front axle taken on line 6—6 of Fig. 5; Fig. 7 is an inverted plan view of the fifth wheel portion of the gear, a part being in section; Fig. 8 is a front edge view of the parts shown in Fig. 7, parts being in section; and Fig. 9 is a sectional view showing means of connecting the braces to the reach.

In the drawings, the numeral 12 indicates a box or body portion of a vehicle, and 13 a rear spring riser or loop attached thereto by means of bolts. The lower end of the spring riser is disposed on top of a leaf spring 14 and connected thereto by means of bolts 15, 15 passing through openings in the riser and extending down alongside of the spring and through openings in clip ties 16, 16 extending across the lower portion of the spring. Nuts are threaded to these bolts in the usual manner so as to securely connect the riser to the spring. The central clip tie is considerably longer than the outer ones and its forwardly extending end is bolted to a reach 17 which connects the rear spring to the front spring. A bolt 18 passes through the riser, the leaves of the spring, and the central clip tie. This bolt is provided with a nut on its lower end and is adapted to prevent endwise displacement of the connected parts. The outer ends of the spring are connected to pairs of links 19, 19 which are pivotally suspended from shackles 20, 20 which are clipped to the rear axle 21 by means of ordinary clips 22, 22. The links are pivoted to the shackles by bolts 23 passing through openings in bosses projecting from the upper portion of the shackles. The medial portion of the axle is curved to correspond with the curve of the spring disposed beneath said axle and positioned adjacent thereto. The outer clip ties connect the shackles and the rear axle and are extended forwardly and twisted a quarter turn and bent at an angle and are connected to the bifurcated ends of brace rods 24, 24 by bolts 25, 25. The forward ends of the brace rods are provided with eyes which are constructed to be connected to short tubular projections 26, 26 extending outwardly from brace end plates 27, 27 riveted to the reach 17. A bolt 28 passes through the tubular projections and the reach and serves to hold the eyes of the brace rods to the brace end plates and permit a slight turning of the eyes on the tubular projections without causing wear on the bolt 28. Washers are provided beneath the head of the bolt and the nut threaded thereon to further protect the same from wear.

The front portion of the gear is similar in construction to the rear portion except that provision is made for connecting the fifth wheel to the front portion to permit the turning of the vehicle. The fifth wheel consists of an upper circular plate 29 connected to a bottom plate 30 fastened beneath the frame of the body of the vehicle, and a lower circular plate 31 connected thereto by means of a king bolt 32 passing through openings in both plates and also through an opening in the frame of the box of the vehicle to permit the lower plate to be freely turned. The lower plate has projecting upwardly therefrom a tubular extension 33 which has a bearing in the opening in the upper plate in order to take the wear from the king bolt. Semicircular portions 34 and 35 concentric with the king bolt, are provided to increase the bearing surface of the fifth wheel, and these portions are slidably held together by means of a strap 36 connected to the bottom plate 30. The lower circular plate 31 is riveted to the upper portion of a front riser or body loop 37, the outwardly extending portions of which carry the lower semi-circle 35, the upper semi-circle 34 being fastened to the bottom plate 30. The lower end of the front spring riser 37 is disposed on top of a leaf spring 38 and connected thereto by bolts 39, 39 passing through openings in the lower end of the riser and depending therefrom alongside of the spring and through clip ties 40, 40 extending across the lower surface of the spring and are provided with the usual nuts. The central clip tie is also connected to the spring by a bolt 41 passing through the riser, the spring and the clip tie, in order to more securely connect the parts together. This central clip tie is also longer than the outer ones and extends rearwardly and is pivotally connected to a perch iron 42 by means of an auxiliary king bolt 43 in vertical alinement with the king bolt 32. The auxiliary king bolt passes through the lower portion of the riser, the perch iron and the clip tie, and is provided with a nut on its lower end. A collar 44 surrounding the auxiliary king bolt is interposed between the lower surface of the riser and the upper surface of the perch iron to keep the two members spaced apart. The rearwardly extending end of the perch rod is rigidly bolted to the reach 17.

The outer ends of the front spring are connected to the front axle 45 in the same manner as the rear axles, by pairs of links 46, 46 pivotally connected to both the ends of the springs and to the shackles 47, 47, and the shackles are secured to the axle by clips 48, 48. Filling blocks 49, 49 are disposed between the upper surfaces of the axles and the curved portions of the shackle plates in both the front and rear axles. Lugs 50, 50 project upwardly from the shackles of the front axle and are adapted to receive therebetween the ends of thills 51 which are pivotally connected thereto by bolts 52, 52. Lips 53, 53 depend from the sides of the shackle plates attached to both front and rear axles and serve to brace the pairs of links against torsional and lateral strains. The links are provided with bearing projections 54, 54 through which bolts 55, 55 pass to prevent wear on said bolts.

It will be seen from the construction just described that a running gear is produced in which the box or body of the vehicle is carried on springs suspended beneath the axles and on account of the linked connections between the springs and the axles, any longitudinal oscillatory movements of the axles will be absorbed thereby, and the vehicle ride as easily as if equipped with pneumatic tires.

The spring risers or body loops connecting the body to the medial portion of the springs will aid in absorbing the vibration and also permit said body to yield only, in substantially a vertical line, as the load disposed in any part of the body is transmitted to the medial portion of the springs suspended beneath the axles.

It will be noted that the axles are entirely free of any connection with the body, reach, or any part of the gear, except by means of the link connection to the ends of the springs. By this provision the minimum amount of vibration is transmitted to the body of the vehicle, thus producing a vehicle which is capable of being used on the roughest roads without liability of damage to the vehicle or discomfort to the occupants thereof.

What I claim as my invention is:

1. A running gear for vehicles, comprising a front and rear axle, springs disposed beneath said axles and having connection therewith, and a reach connected to both springs.

2. A running gear for vehicles, comprising a front and rear axle, springs suspended beneath said axles by links, and a reach connected to both springs.

3. A running gear for vehicles, comprising a front and rear axle, springs suspended beneath said axles by links, and a reach rigidly connected to one of the springs and pivotally connected to the other.

4. A running gear for vehicles, comprising a front and rear axle, springs suspended beneath said axles by links constructed to permit an independent longitudinal movement of the axles, a reach rigidly connected to one of the springs and pivotally connected to the other, and yielding means for connecting the springs to a vehicle body.

5. A running gear for vehicles, comprising a front and rear axle, springs suspended beneath said axle by means of links constructed to permit an independent longitudinal movement of the axles, a reach pivotally connected to one of the springs and rigidly connected to the other, stay rods having pivotal connection to one of the axles and to the reach, and means for connecting the springs to a vehicle body.

6. A running gear for vehicles, comprising a front and rear axle, springs suspended beneath said axles by links, a reach pivotally connected to one of the springs and rigidly connected to the other, a riser rigidly connected to the rear spring and to a vehicle body, and a riser rigidly connected to the front spring and pivotally connected to the vehicle body.

7. A running gear for vehicles, comprising a front and rear axle, springs suspended beneath said axles by links, a reach pivotally connected to one of the springs and rigidly connected to the other, a spring riser rigidly connected to the rear spring and to a vehicle body, a spring riser rigidly connected to the front spring, a fifth wheel connected to the front riser, and means for connecting the fifth wheel to a vehicle body.

8. A running gear for vehicles, comprising a front and rear axle, springs disposed beneath said axle, links connected to the ends of the springs and to shackles fastened to the axles, spring risers connected to the springs, a fifth wheel connected to one of the risers, and a reach connected rigidly to one spring and pivotally to the other.

9. A running gear for vehicles, comprising a front and rear axle, springs suspended beneath said axles, links provided with bearing projections pivotally connected to said springs and to shackles fastened to the axles, thills connected to the shackles disposed on the front axle, a reach pivotally connected to the front spring and rigidly connected to the rear spring, stay rods pivotally connected to the rear axle and to stay rod plates connected to the reach, risers connected to both springs, and a fifth wheel connected to one of the risers.

10. A running gear for vehicles, comprising a front and rear axle, springs suspended beneath said axles, links provided with bearing projections pivotally connected to said springs and to shackles fastened to the axles, thills connected to the shackles disposed on the front axle, a reach pivotally connected to the front spring and rigidly connected to the rear spring, stay rods pivotally connected to the rear axle and to stay rod plates connected to the reach, risers connected to both springs, and a fifth wheel connected to one of said risers and provided with concentric plates and a king bolt, the king bolt being in vertical alinement with the pivotal connection of the reach and spring.

In testimony whereof, I affix my signature, in presence of two witnesses.

WILLIAM SHAW.

Witnesses:
C. T. BENEDICT,
ALMA A. KLUG.